(12) United States Patent
Franchet et al.

(10) Patent No.: US 6,845,606 B2
(45) Date of Patent: Jan. 25, 2005

(54) VARIABLE CYCLE PROPULSION SYSTEM WITH GAS TAPPING FOR A SUPERSONIC AIRPLANE, AND A METHOD OF OPERATION

(75) Inventors: Michel Franchet, Pouilly le Fort (FR); Yann Laugier, Noiseau (FR); Jean Loisy, Ponthierry (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 10/167,602

(22) Filed: Jun. 13, 2002

(65) Prior Publication Data
US 2002/0189230 A1 Dec. 19, 2002

(30) Foreign Application Priority Data
Jun. 14, 2001 (FR) ............................................. 01 07771

(51) Int. Cl.[7] ................................................. F02K 3/00
(52) U.S. Cl. .......................................... 60/225; 60/263
(58) Field of Search .......................... 60/224, 225, 263, 60/269

(56) References Cited
U.S. PATENT DOCUMENTS

| 3,194,516 A | * | 7/1965 | Messerschmitt | 60/224 |
| 3,215,369 A | | 11/1965 | Johnson | |
| 3,279,191 A | * | 10/1966 | Keenan et al. | 60/263 |
| 3,318,095 A | * | 5/1967 | Snell | 60/224 |
| 3,366,350 A | * | 1/1968 | Hoffert et al. | 60/263 |
| 3,442,082 A | * | 5/1969 | Peterson | 60/224 |
| 3,486,699 A | * | 12/1969 | Jumelle | 60/263 |
| 3,635,029 A | * | 1/1972 | Menioux | 60/224 |
| 3,810,360 A | * | 5/1974 | Leibach | 60/263 |
| 3,893,638 A | * | 7/1975 | Kelley | 60/225 |
| 4,193,262 A | | 3/1980 | Snell | |

FOREIGN PATENT DOCUMENTS
FR 2784960 * 4/2000

* cited by examiner

Primary Examiner—Michael Koczo
(74) Attorney, Agent, or Firm—Oblon, Spivak, McClelland, Maier & Neustadt, P.C.

(57) ABSTRACT

A variable cycle propulsion system for a supersonic airplane, the system comprising at least one engine having means for producing exhaust gas and a gas exhaust nozzle for generating thrust for supersonic flight speeds, and at least one separate auxiliary propulsion assembly dissociated from said engine, having no gas generator, and capable of generating thrust for takeoff, landing, and subsonic flight speeds. The system further comprises gas flow tapping means movable between a position in which they tap off at least a fraction of the exhaust gas produced by said engine and feed it to said propulsion assembly to enable it to generate thrust for takeoff, landing, and subsonic cruising flight, and a position in which the gas produced by the engine is directed solely to the engine nozzle for supersonic cruising flight.

13 Claims, 3 Drawing Sheets

VARIABLE CYCLE PROPULSION SYSTEM WITH GAS TAPPING FOR A SUPERSONIC AIRPLANE, AND A METHOD OF OPERATION

BACKGROUND OF THE INVENTION

The present invention relates to a variable cycle propulsion system for a supersonic airplane making it possible both to obtain high thrust and a large bypass ratio for takeoff, landing, and subsonic cruising flight so as to greatly reduce and improve specific consumption during these stages of flight, and also to obtain a high exhaust speed adapted to supersonic cruising flight.

More particularly, the invention relates to a propulsion system having auxiliary fans separate from the engines and adapted to subsonic flight (in terms both of noise and fuel consumption).

In another aspect of the invention, it also relates to a method of operating said variable cycle propulsion system.

When designing a supersonic commercial airplane, there arises the particular problem of keeping airplane engine noise low during takeoff, climbing, and landing. In order to be certified, all airplanes must nowadays comply with low-noise regulations for takeoff and landing.

Furthermore, supersonic airplane engines must also satisfy requirements of low engine pod drag during supersonic cruising, low specific fuel consumption while overflying inhabited areas at subsonic cruising speed, and reduced emissions of nitrogen oxide pollution close to the ozone layer at high altitude.

In order to satisfy those various requirements, engine manufacturers have proposed a variable cycle engine for supersonic airplane propulsion. Typically, that type of engine takes up two different configurations: one for subsonic cruising flight, takeoff, and landing; and the other for supersonic cruising flight, given the degree of incompatibility between those two stages of flight in terms of engine operation.

The requirement for low engine noise during takeoff and landing implies, in particular, that gas should be ejected at low speed during takeoff and landing and while cruising at subsonic speed, and that is in contradiction with being able to cruise at supersonic speed, which requires gas to be ejected at high speed.

Noise level depends on gas exhaust speed, and to reduce noise to an acceptable level, exhaust speed must nowadays be less than 400 meters per second (m/s), which corresponds to a threshold of 103 decibels (dB) (with new regulations reducing this to 300 m/s or 90 dB as from the year 2006). Such an exhaust speed thus implies an engine having low specific thrust, which corresponds to a large bypass ratio, i.e. a high level of drag when cruising at supersonic speed.

Thus, the variable cycle engines proposed by manufacturers seek to combine low engine noise during takeoff and landing, low specific fuel consumption during subsonic cruising, and high specific thrust during high altitude supersonic cruising.

Various variable cycle engine designs are known, however varying the bypass ratio of such designs does not enable good optimization both in the subsonic configuration and in the supersonic configuration.

Adopting a gas exhaust speed equal to or less than 400 m/s requires an engine pod of large diameter, and all variable cycle engines known at present thus require a pod front section that is greater than the optimum section for supersonic cruising flight.

For example, U.S. Pat. No. 5,529,263 discloses a supersonic airplane having a propulsion assembly for takeoff, landing, and subsonic cruising flight, and two engines adapted for supersonic cruising flight. The propulsion assembly is constituted by retractable high-bypass ratio booster turbojets, which presents numerous drawbacks, in particular concerning bulk and weight for the airplane.

OBJECT AND SUMMARY OF THE INVENTION

The present invention thus seeks to mitigate such drawbacks by proposing a variable cycle propulsion system for supersonic airplanes in which the subsonic and supersonic configurations are well separated, in particular by using one or more separate auxiliary fans of large diameter that are optionally retractable during supersonic cruising flight. The invention also proposes a method of operating such a propulsion system.

To this end, the invention provides a variable cycle propulsion system for a supersonic airplane, the system comprising at least one engine having means for producing exhaust gas and a gas exhaust nozzle for generating thrust for supersonic flight speeds, and at least one separate auxiliary propulsion assembly dissociated from said engine, having no gas generator, and capable of generating thrust for takeoff, landing, and subsonic flight speeds, said system further comprising gas flow tapping means movable between a position in which they tap off at least a fraction of the exhaust gas produced by said engine and feed it to said propulsion assembly to enable it to generate thrust for takeoff, landing, and subsonic cruising flight, and a position in which the gas produced by the engine is directed solely to the engine nozzle for supersonic cruising flight.

Thus, the propulsion assembly dedicated to takeoff, landing, and subsonic cruising flight uses resources (gas generator) of the engines that are dedicated to supersonic cruising flight. Said propulsion assembly comprises one or more fans driven by gas tapped from the engine(s). The fans can be housed within the airplane fuselage or they can be retractable, thus enabling them to be of dimensions sufficient for producing the necessary thrust with a high bypass ratio, while nevertheless retaining low drag in supersonic flight.

BRIEF DESCRIPTION OF THE DRAWINGS

Other characteristics and advantages of the present invention appear from the description given below with reference to the accompanying drawings of various embodiments that do not have any limiting character. In the figures.

DETAILED DESCRIPTION OF EMBODIMENTS

Figure 1A:
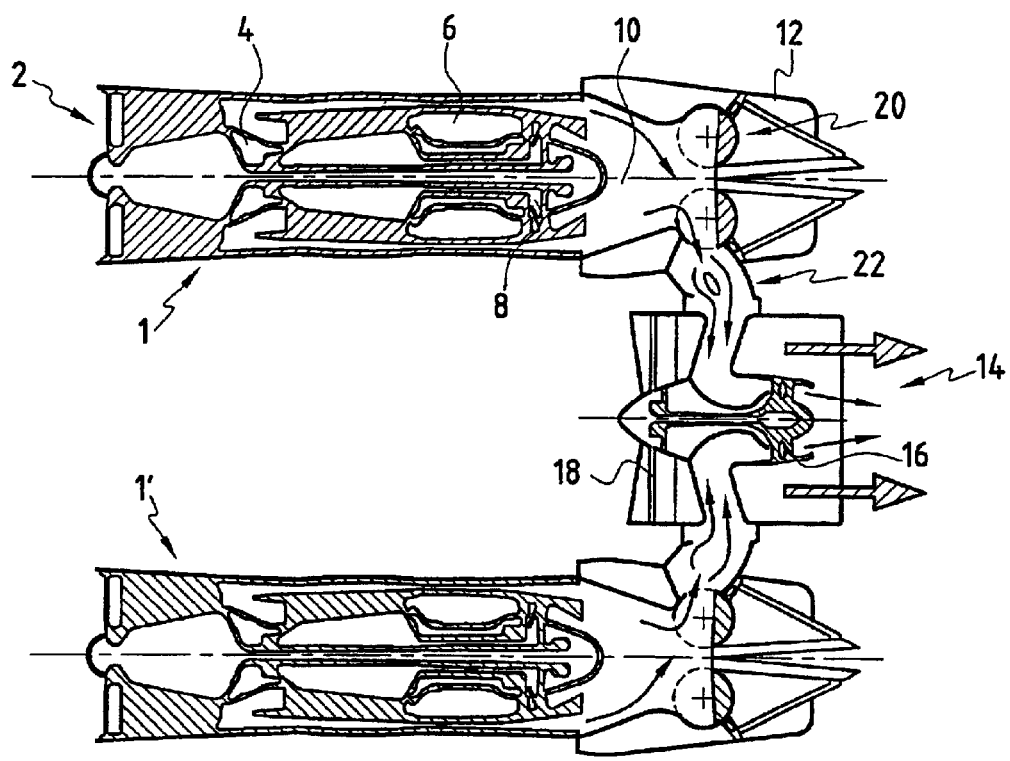
FIGS. 1A and 1B are diagrammatic views of a first embodiment of a propulsion system of the invention respectively in its configuration for takeoff, landing, and subsonic cruising flight, and in its configuration for supersonic cruising flight.
Figure 1B:
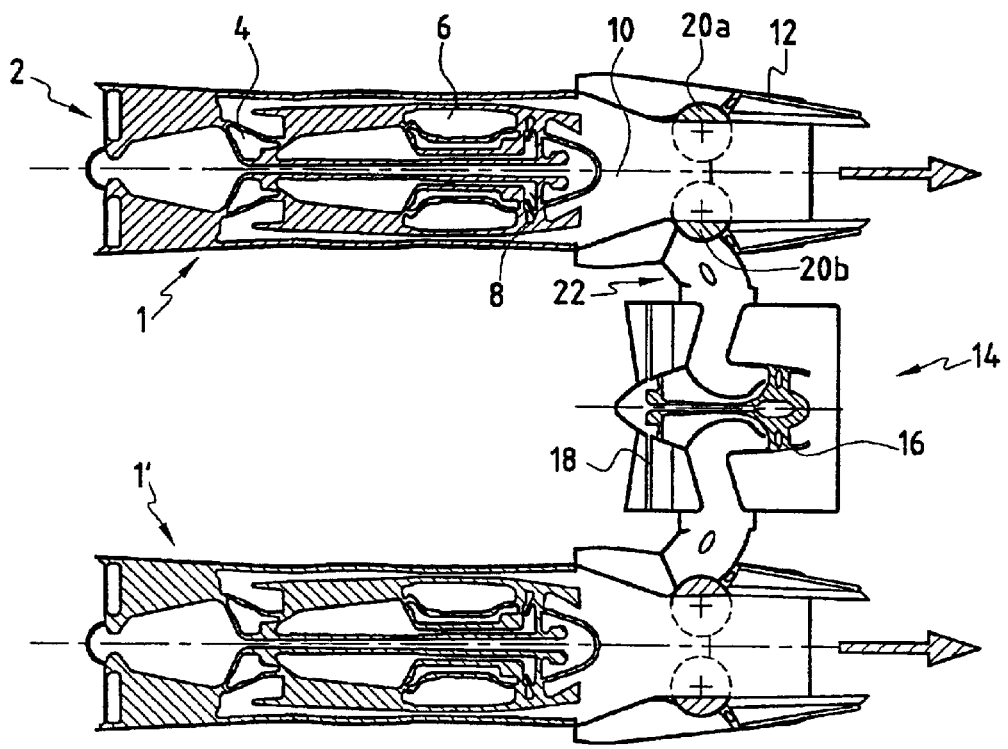

With reference to FIGS. 1A and 1B, which are diagrammatic longitudinal section views through a system constituting a first embodiment of the invention, it can be seen that the system is constituted in particular by two engines 1 and 1'. These engines are conventionally disposed in low-drag pads (not shown) which are generally connected to the bottom faces of the wings of an airplane, but which could equally well be installed on the top faces of the wings.

In conventional manner, the engines can be of the single-flow type, having one, two or three shafts, or of the double-flow type, having one, two or three shafts. In this embodiment, each engine comprises an air intake 2, a compressor section 4, a combustion chamber 6, a turbine section 8, and a combustion gas exhaust section 10. The engines are also dimensioned optimally for supersonic cruising flight (the period involving the longest flying time).

The combustion gas exhaust section 10 is terminated with a variable geometry nozzle 12 that is axially symmetrical or two-dimensional, e.g. in order to provide variations in exhaust section (opening or closing and total or partial tapping) throughout all stages of flight (takeoff, landing, subsonic cruising and supersonic cruising).

In addition, and still in this first embodiment of the invention, the propulsion system also includes an auxiliary propulsion assembly 14 that is separate and dissociated from the two engines 1 and 1' and that does not have its own gas generator. The term "dissociated" from the engine means that the auxiliary propulsion assembly is not integrated in either engine, but is offset from both of them. This propulsion assembly comprises a turbine 16 and a fan 18 which is advantageously of large diameter and which is rotated by said turbine. This propulsion assembly is used for takeoff, landing, and subsonic cruising flight in a configuration that is described in greater detail below.

Conventionally, the fan 18 can be a single- or multi-stage fan of large chord or contra-rotating, and it is rotated by the turbine 16, which can optionally be fitted at its end with a multi-stage hub and/or reduction gearing.

Furthermore, means 20 are also provided in the vicinity of the nozzles 12 of the engines for tapping off at least a fraction of the exhaust gases produced by the engines 1 and 1' and for closing off their nozzles 12 so as to feed said propulsion assembly with gas.

By way of example, these tapping means can be constituted by two flaps 20a and 20b (or half-shells) placed in the nozzle 12 of each engine on the path followed by the exhaust gas, together with one or more tubes 22 connecting the exhaust section 10 of each engine to the propulsion assembly 14.

In each engine, the two flaps are capable of pivoting about respective shafts in order to define at least two positions: one position corresponding to tapping off at least a fraction of the exhaust gas to the propulsion assembly via at least one tube 22, the nozzle 12 of the engine then being closed off at least in part by the flaps; and another position corresponding to no tapping, the nozzle 12 being opened and the tube 22 being closed off by one of the flaps (20b). Changeover from one configuration to the other occurs under appropriate command, causing the flaps 20a and 20b to tilt from one position to the other.

It should be observed that opening or closing off, the nozzles of the engines, at least in part, and also closing off or opening access to the tubes 22 can alternatively be performed by using members that are distinct and that are actuated synchronously.

It is also possible to envisage that the flaps 20a and 20b or other members actuated synchronously therewith, when in their non-tapping position, serve to close off the tube 22 completely so as to avoid feeding any gas to the propulsion assembly 14.

The tubes 22 are in the form of ducts opening out into the volute of each turbine 16. In addition, when the propulsion system comprises at least two engines 1 and 1' feeding a single propulsion assembly 14, the tubes 22 open out into the turbines 16 through sectors that are advantageously isolated from each other. This characteristic serves to increase the safety of the system. In the event of one of the engines 1 and 1' failing, the risk of the gas produced by the other engine penetrating into the failed engine is thus averted.

The operation of this first embodiment of a propulsion system of the invention is described below, in both of its possible configurations (takeoff, landing, subsonic cruising, or supersonic cruising).

During takeoff and landing (cf. FIG. 1A), the engines 1 and 1' are operated at less than full speed, with the exhaust nozzles 12 of the engines being shut off and with the means 20 for tapping the exhaust gases being actuated so as to feed the turbine 16 of the propulsion assembly 14 with gas, said turbine then driving the fan 18.

The propulsion system thus operates with a large bypass ratio and low specific thrust which is entirely appropriate for takeoff, landing, and subsonic cruising, and which makes it easier to comply with noise requirements and low specific consumption requirements. The bypass ratio is the ratio of the mass of air exhausted by the fans over the mass of exhaust gas ejected by the engines 1, 1'.

By driving the fans 18, the exhaust gas produced by the engines 1 and 1' is slowed down very considerably, so the gas is exhausted at low speed, which helps achieve low levels of noise.

While the airplane is accelerating and during subsonic cruising, the nozzles 12 of the engines 1 and 1' are advantageously opened slightly so as to reduce base drag.

Transition between subsonic cruising flight and supersonic cruising flight (cf. FIG. 1B) takes place by moving the tapping means 20 so as to open the nozzles 12 progressively while simultaneously closing off the tubes 22 until the propulsion assembly 14 stops. The engines 1 and 1' then propel the airplane on their own, and enable it to reach supersonic flight speeds. The system then operates at very low (or even zero) bypass ratio and with a very high exhaust speed (which does indeed correspond to high specific thrust).

Figure 2:
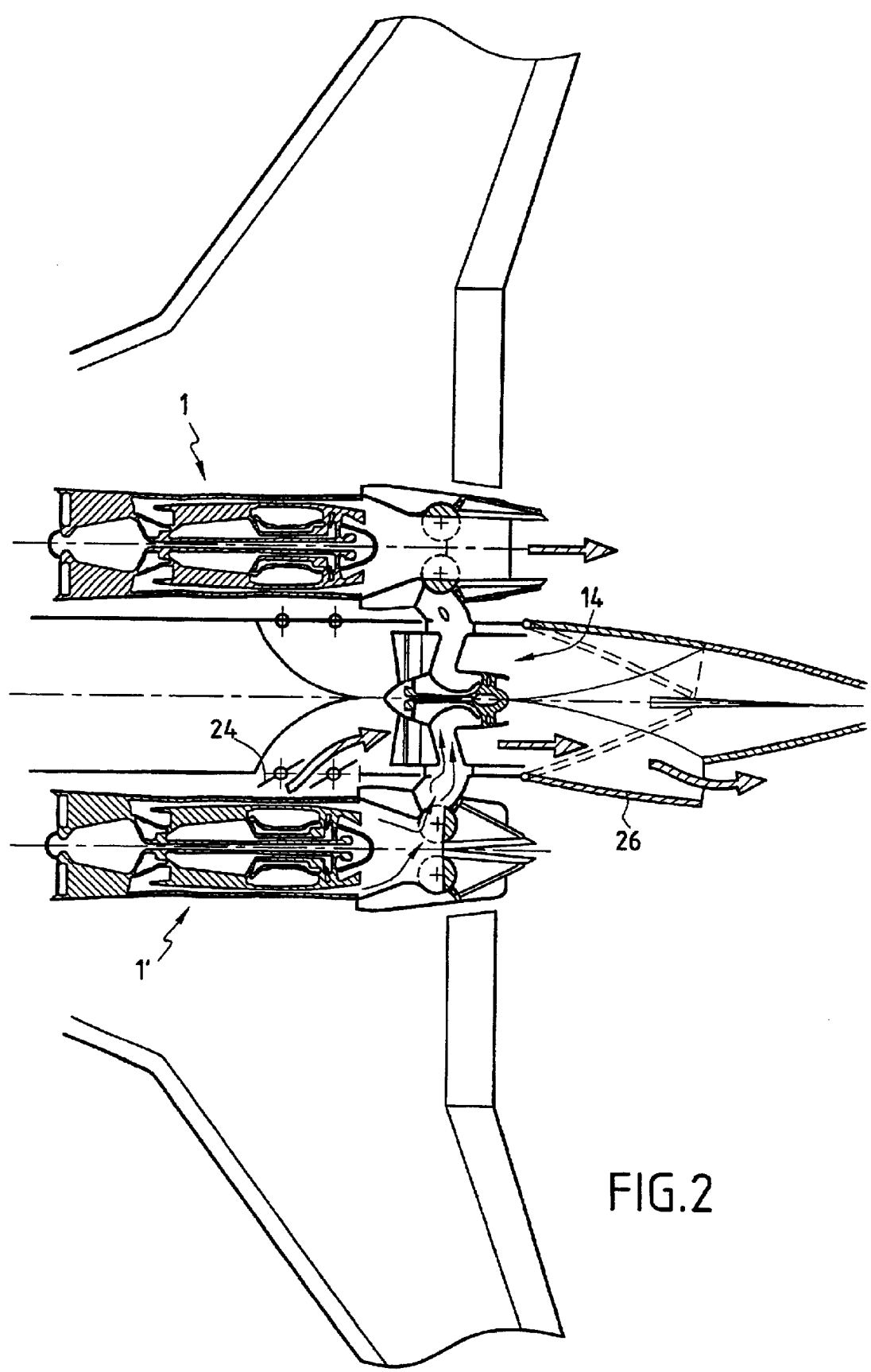
FIG. 2 is a fragmentary longitudinal section view of a supersonic airplane including the FIG. 1 system and shown in both configurations of use.
Figure 3:
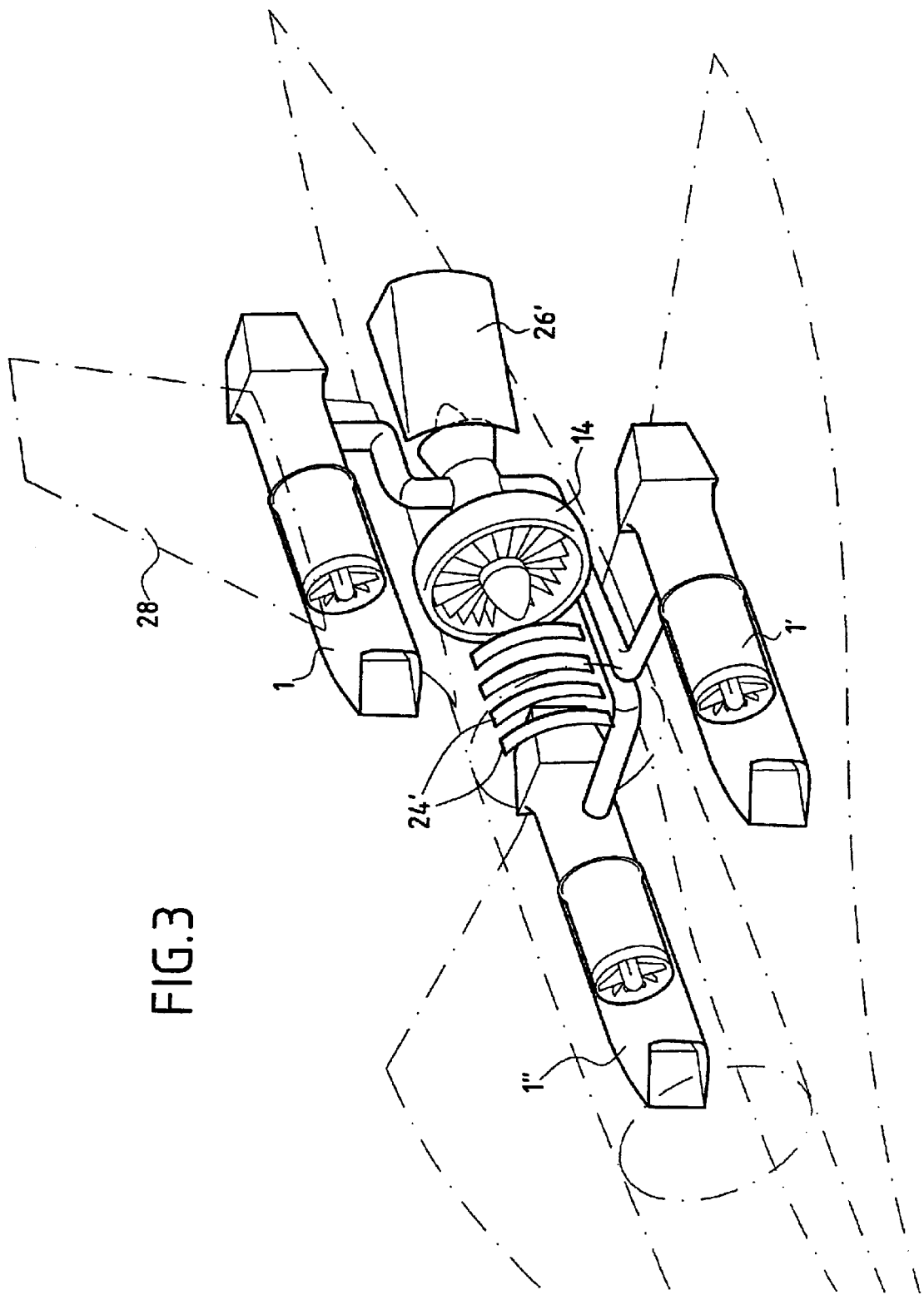
FIG. 3 is a diagrammatic perspective view of an airplane including a propulsion system constituting a second embodiment of the invention.

As shown in FIG. 2, the propulsion assembly 14 can be integrated directly in the fuselage of the airplane, in the rear portion thereof. To do this, closeable side louvers 24 are included in the airplane fuselage so as to be able to feed the propulsion assembly 14 with air, and deployable exhaust nozzles 26 enable the gas from the propulsion assembly to be exhausted during takeoff, landing, and subsonic cruising In a second embodiment of the invention, shown in FIG. 3, the propulsion system comprises three engines 1, 1', and 1") feeding a single propulsion assembly 14 that is separate and dissociated from all three engines. As in the embodiment shown in FIG. 2, the propulsion assembly in this embodiment is directly integrated in the rear portion of the airplane, and a deployable exhaust nozzle 26' is provided for exhausting the gases and producing the thrust needed for takeoff, landing, and subsonic cruising flight. In this example, it can be seen that two of the engines (1' and 1") are located beneath the wings of the airplane, while the third engine (1) is mounted at the root of the tailplane 28.

The tubes connecting the exhaust sections of the engines to the turbines of the propulsion assembly 14 open out into said assembly via sectors that are advantageously isolated from one another. Thus, in the event of one of the engines failing, there is no risk of the gas produced by the other two engines penetrating into the failed engine.

Furthermore, louvers 24' (side louvers and/or ventral louvers) that can be closed are provided in the fuselage of the airplane to feed the propulsion assembly 14 with air. On passing to supersonic cruising flight, the propulsion assembly 14 is no longer fed and is therefore stopped, with the air feed louvers 24' being closed and with the exhaust nozzle 26' being retracted. This reduces drag to that produced by the pods of the engines.

This solution presents the particular advantage of obtaining very good sound insulation for the propulsion assembly and of reducing the risk of foreign bodies being ingested during airplane takeoff (debris on the runway, pieces of tire, birds, etc.).

Naturally, any other embodiment could be envisaged by combining one or more engines with one or more propulsion assemblies, which assemblies can optionally be retractable.

The method of operating the propulsion system of the present invention stems obviously from the above description.

The propulsion system comprises at least one engine capable of producing exhaust gas for generating thrust for supersonic flight and at least one separate propulsion assembly that is dissociated from said engine, having no gas generator of its own and suitable for generating thrust for takeoff, landing, and flight at subsonic speed.

The operating principle of the propulsion system consists in tapping at least a fraction of the exhaust gas produced by the engine(s) and feeding it to the propulsion assembly so as to enable the propulsion assembly to generate thrust for takeoff, landing, and subsonic cruising flight.

In contrast, when changing over to supersonic cruising flight and during such flight, the exhaust gases are no longer tapped and fed to the propulsion assembly, and the engine(s) alone provide propulsion.

Advantageously, the outlet(s) for the combustion gas produced by the engine(s) is/are closed at least in part during takeoff and landing.

Preferably, during acceleration and subsonic cruising flight, the outlet(s) for the exhaust gas produced by the engine(s) is/are opened slightly so as to reduce base drag. On going over to supersonic cruising flight, the tapping of the exhaust gas produced by the engine(s) is progressively shut off while the nozzle(s) of the engine(s) is/are progressively opened up until the propulsion assembly ceases to operate with the engine(s) alone providing propulsion.

The present invention as described above provides numerous advantages, and in particular:

- the propulsion system makes it possible to take off and land with gas being exhausted at a speed of less than 400 m/s (or less than 300 m/s), which corresponds to a noise level of less than 103 dB (or less than 90 dB for an exhaust speed of less than 300 m/s);
- thrust on takeoff can be increased, for example, by a ratio of about 150% to 300% relative to the thrust that could be produced by the engine(s) operating alone, depending on the diameter of the fan in the propulsion assembly, thus making it possible to reduce the number of engines, three instead of four, two instead of three, etc.;
- a considerable decrease can be obtained in specific consumption during subsonic cruising because of the high bypass ratio, which is equivalent to that of subsonic airplanes;
- in embodiments having a retractable or inboard propulsion assembly, the drag of the fans is nil during supersonic cruising flight;
- the transition from subsonic cruising flight to supersonic cruising flight is made easier because tapping of the gas is performed progressively, and it can also be performed quickly in the event of the fan breaking down;
- the propulsion system uses one or more engines of conventional architecture, thereby limiting the risks of breakdown frequently associated with new technologies;
- the thermodynamic cycle of the system remains independent of the way tapping is distributed during the subsonic to supersonic transition, thus making engine control easier;
- in terms of safety, the reserve power from the engines, which run at somewhat reduced speed during takeoff and landing, can make it possible to maintain sufficient thrust using a direct jet in order to guarantee takeoff (and subsequent landing) in the event of an engine breaking down; and
- in the event of a mechanical breakdown of the propulsion assembly including the fan, the exhaust nozzles of the engines can be opened quickly (if necessary), thus providing the required thrust in a direct jet for takeoff and/or landing (where the overriding concern is no longer complying with noise standards but avoiding any accident to the airplane).

Naturally, the present invention is not limited to the embodiments described above, and it covers any variant thereof.

What is claimed is:

1. A variable cycle propulsion system for a supersonic airplane, the system comprising:

at least one engine comprising means for producing exhaust gas and a gas exhaust nozzle configured to generate thrust for supersonic flight speeds;

a propulsion assembly dissociated from said engine, having no gas generator, and configured to generate thrust for takeoff, landing, and subsonic flight speeds; and gas flow tapping means movable between a position in which the gas flow tapping means taps off at least a portion of the exhaust gas and feeds the tapped off exhaust gas to said propulsion assembly for generating thrust for takeoff, landing, and subsonic cruising flight, and a position in which the exhaust gas is directed solely to the engine nozzle for supersonic cruising flight, wherein the propulsion assembly comprises a turbine and a fan configured to be rotated by the turbine, and wherein the propulsion assembly is integrated within a fuselage of the airplane and configured to reduce drag and to improve sound insulation, and wherein the at least one engine comprises at least two engines configured to feed the propulsion assembly with gas.

2. The system according to claim 1, wherein the gas flow tapping means comprises flaps and a tube opening into an inlet of the turbine.

3. The system according to claim 1, wherein the at least one engine comprises at least three engines configured to feed the propulsion assembly.

4. The system according to claim 1, wherein the at least one engine comprises at least two engines, and the propulsion assembly is offset from both engines.

5. A propulsion system comprising:

at least one engine configured to generate an exhaust gas, the engine comprising a nozzle;

a propulsion assembly disposed within a fuselage of an airplane; and means for directing a portion of the exhaust gas otherwise directed to the nozzle to the propulsion assembly under a first set of conditions, wherein the at least one engine comprises at least two engines.

6. The system according to claim 5, wherein the first set of conditions comprises at least one of takeoff, landing, and subsonic flight.

7. The system according to claim 6, wherein the first set of conditions comprises takeoff, landing, and subsonic flight.

8. The system according to claim 5, wherein the means is configured to direct all the exhaust gas to the nozzle during supersonic flight.

9. The system according to claim 5, wherein the propulsion assembly is not configured to generate an exhaust gas.

10. The system according to claim 5, wherein the propulsion assembly comprises a turbine and a fan configured to be rotated by the turbine.

11. The system according to claim 5, wherein the at least two engines comprises three engines.

12. The system according to claim 5, wherein the means is disposed within the fuselage of the aircraft.

13. The system according to claim 12, wherein the means comprises at least one of a flap positionable to permit and to prevent exhaust gas flow to the nozzle.

* * * * *